Patented Nov. 30, 1926.

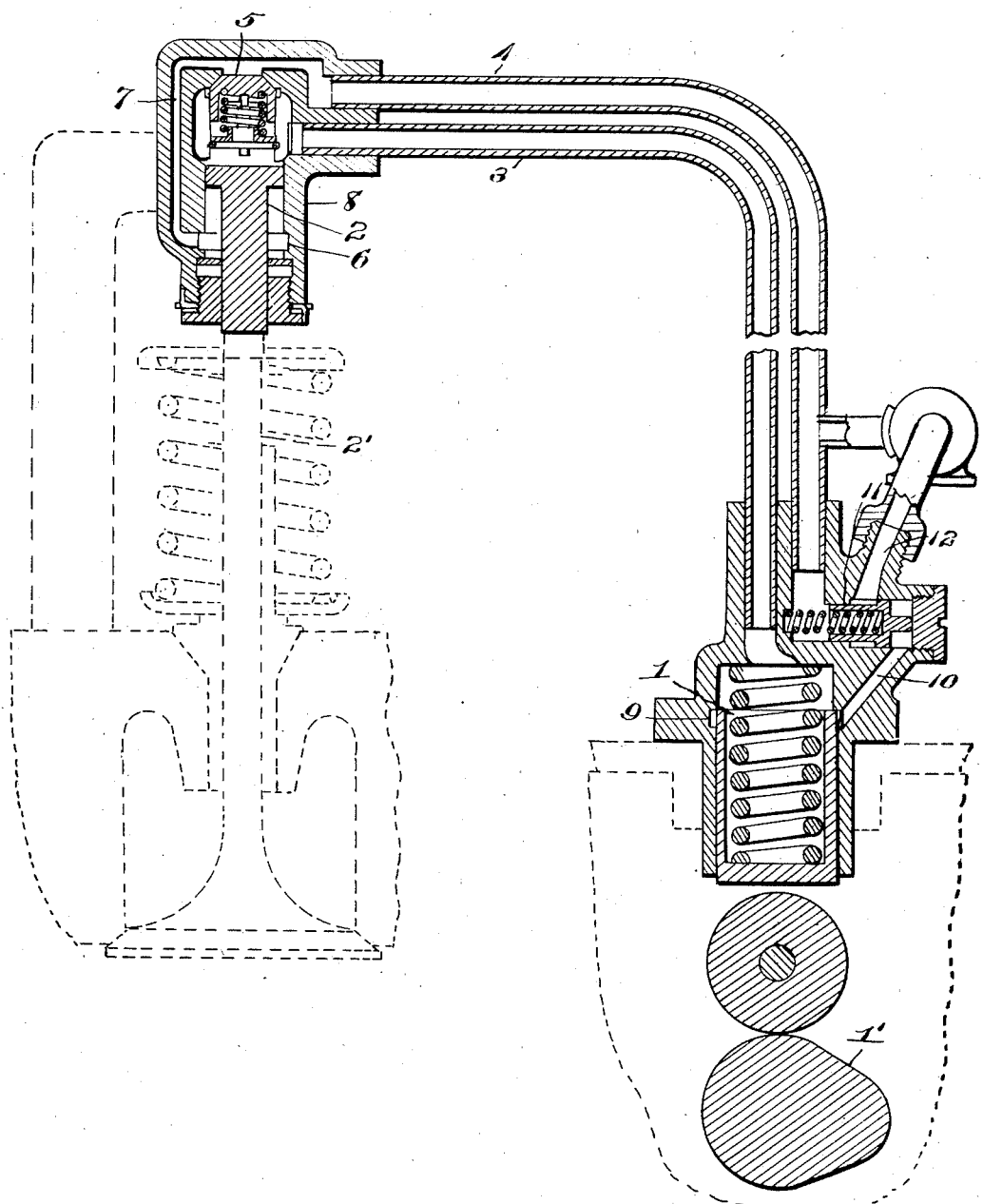

1,608,770

UNITED STATES PATENT OFFICE.

HAROLD CAMINEZ, OF DAYTON, OHIO.

VALVE-OPERATING MEANS FOR INTERNAL-COMBUSTION ENGINES.

Application filed March 29, 1923. Serial No. 628,655.

This invention relates to valve-operating means especially designed for use in connection with valves of an internal combustion engine.

The usual mechanical valve operating mechanism is not entirely satisfactory for certain types of engine and cylinder designs where latitude is required in the arrangement of the valves or in the positioning of the camshaft. The push rod mechanism used in radial engines and the link arrangements that must be employed to operate the valves of 4-valve spherical head cylinders suffer from the following defects; weight and complication of parts, variation of valve stem clearance and valve timing with operating conditions, hammering effects on the valve mechanism due to valve stem clearance, difficulties of lubricating all moving parts, and inability to operate at high speeds. These faults present in the conventional valve gear have reacted unfavorably on the development of radial engines and 4-valve spherical head cylinders.

The object of the present invention is to overcome the defects, objections and difficulties above enumerated by the use of a carefully designed, practical and efficient hydraulic or fluid pressure means for transmitting impulses to the valves from the camshaft.

With the above and other objects in view, the invention consists in the novel construction, combination and arrangement herein fully described, shown and claimed.

The accompanying drawing represents a sectional view of the improved valve operating means.

In carrying out the present invention the cam follower plunger 1 which is operated by the usual cam 1' imparts its motion to the valve operating plunger 2 through the medium of a column of fluid such as oil in the operating line 3 shown in the form of a pipe. In order to insure that the operating line and the chambers in which the plungers 1 and 2 operate are completely filled with oil or other fluid or liquid, the fluid is let into the system from an oil supply line 4 through a non-return or check-valve 5. The oil supply line 4 is supplied with oil under pressure from a connection with an external source, such as an oil pump. The oil or other fluid under pressure automatically takes up all clearance between the valve operating plunger and the valve stem 2' and also between the cam follower plunger 1 and the cam, thus eliminating lost motion and hammering effects.

A groove or channel 6 of annular formation which communicates with the oil supply line through a bypass 7, is formed near the bottom of the valve operating chamber 8. The primary purpose of this channel is to limit the travel of the valve operating plunger 2 so that in case the valve stem sticks and the plunger 2 fails to return to its initial position, the next lift of the cam follower plunger 1 will not expel the plunger 2 from its casing or chamber. The upper edge of the channel is so located as to be slightly above the upper edge of the plunger 2 when the plunger is at its lowest position so as to permit the oil to by-pass from about the plunger. A further purpose of the channel 6 is to permit a differential type of plunger to be used with the supply oil under pressure acting on both sides thereof so that a high oil supply pressure may be employed without it exerting too great a force on the valve stem.

The cam follower plunger 1 uncovers an annular channel 9 when said plunger is at the bottom of its stroke, said channel communicating with the oil sump or the inlet side of an oil supply pump through the bypass 10, pressure regulating relief valve 11 and passage 12. Pressure regulating relief valve 11 is adapted to be moved towards the left, as shown in the drawing against the action of a coiled spring when the operating line 3 and by-pass 10 are in communication through channel 9, the left hand end of this relief valve being of smaller cross sectional area than the right hand end which communicates with the by-pass 10. When the channel 9 is uncovered, fluid from the supply line 4 may be circulated through the operating line 3, the fluid flowing from the non-return valve 5 to the channel 9 and from there to the oil pump intake.

The differential relief valve 11 maintains the outlet valve pressure at a fixed ratio of the supply oil pressure and thereby controls the oil flow through the operating line. The purpose of this oil flow is to prevent the formation of bubbles or air pockets in the operating line by keeping fresh cool oil or other liquid in this line. The channel 9 by providing an outlet for the oil in the operating line when the plunger is at the bottom of the stroke, automatically takes care of any expansion of the fluid and thereby insures that the oil in the operating line will not prevent the valve from seating.

When the cam follower plunger 1 is moving at a slow speed it will not begin to lift the valve operating plunger until it entirely covers up the channel 9 and thus prevents the escape of oil from the operating line. However, at higher speeds there will be an increased resistance to the flow of the oil into this channel as the passage to the channel grows smaller, so that as the speed increases, oil pressure sufficient to operate the valve will build up before the channel is entirely covered or a little earlier in the stroke. The magnitude of this action depends mainly upon the design of the channel, the top of the cam follower plunger and the cam profile. This action may be controlled by the design so that it will merely compensate for the usual lag in the transmission of the operating impulses or it may be made sufficiently great to effect an earlier opening movement of the valve as the speed of the engine increases.

It will be observed that I thus provide means for circulating the fluid through the operating line under pressure so that the fluid through which the power impulses are transmitted is always maintained in a cool and fresh condition. It will also be observed that I have provided means for regulating the fluid circulation pressure. Experience with hydraulic transmission systems shows that when impulses are transmitted in rapid succession through a fluid column or line, some energy is lost and this is converted into heat in the operating line. If no means be provided to eliminate this heat the temperature of the fluid will rise unduly. A fluid at a high temperature is not a satisfactory medium for the transmission of power impulses because the operating column will become highly resilient, especially if the temperature is sufficient to cause the formation of bubbles in the fluid due to vapor or the freeing of occluded gases. A resilient medium will absorb rather than transmit power impulses.

The channel in the cam follower chamber acts as a means to compensate for the increase in lag, which takes place with the increase of engine speed. This channel is overrun by the cam follower plunger or piston when the valve is closed and thereby serves as a connection or communication between the operating line and the inlet side of the fluid circulating pump. On the outward movement of the cam follower plunger this channel is gradually closed. As long as the fluid is freely escaping into this channel there will not be sufficient pressure in the operating line to open the valve of the engine cylinder. At slow speeds the oil will escape freely until the channel is entirely covered. At higher speeds pressure sufficient to open the valve will be obtained before the channel is entirely covered by the plunger, due to the increase in resistance to the flow of the fluid with increase of velocity. The magnitude of this action depends upon the shape of the channel, the viscosity of the fluid and the outline of the cam. This part of the mechanism may be so designed that all lag in the transmission of power impulses may be compensated for. The means for limiting the travel of the valve operating plunger is also an important feature. It is essential where provision is made for automatically taking up all valve tappet clearance, for in case the valve stem should stick or for any other reason the plunger should not be returned to its initial position the next revolution of the cam would expel the plunger from its chamber or casing and thus render the system inoperative.

I claim:—

1. In combination, a cam-operated plunger, a fluid chamber in which said plunger operates, an operating plunger, a fluid chamber in which the last named plunger operates, a fluid operating line connecting said chambers, and a fluid supply conduit connected to said fluid operating line for circulating fluid from an outside source through the operating line so that the fluid through which the power impulses are transmitted is constantly changing.

2. In combination, an operated plunger, a chamber in which said plunger operates, a valve-operating plunger, a fluid chamber in which the last named plunger operates, a fluid operating line connecting said chambers, and means for circulating fluid from an outside source through the operating line comprising a fluid conduit connected to an outside source, a one way valve connecting said fluid conduit to said operating line, and a by-pass to periodically interconnect said operating line to the intake side of said outside source.

3. In combination, a cam-operated plunger, a fluid chamber in which said plunger operates, a valve-operating plunger, a fluid chamber in which the last named plunger operates, a fluid operating line connecting said chambers, means for circulating fluid under pressure from an outside source through said operating line, and pressure regulating means for the fluid.

4. In combination, a cam-operated plunger, a fluid chamber in which said plunger operates, a valve-operating plunger, a fluid chamber in which the last named plunger operates, a fluid operating line connecting said chambers, and a fluid supply conduit connected to said fluid operating line for periodically circulating fluid under pressure from an outside source through the operating line.

5. In combination, a cam-operated plunger, a fluid chamber in which said plunger operates, a valve-operating plunger, a fluid chamber in which the last named plunger operates, a fluid operating line connecting said chambers, a fluid supply conduit connected to said fluid operating line for periodically circulating fluid under pressure from an outside source through the operating line, and pressure regulating means with the fluid in said operating line.

6. In combination, a cam-operated plunger, a fluid chamber in which said plunger operates, a valve-operating plunger, a fluid chamber in which the last named plunger operates, a fluid operating line connecting said chambers, pressure circulating means for the fluid in said operating line, and means to automatically compensate for increase in lag of power impulses due to increase in engine speed.

7. In combination, a cam-operated plunger, a fluid chamber in which said plunger operates, a valve-operating plunger, a fluid chamber in which the last named plunger operates, a fluid operating line connecting said chambers, pressure circulating means for the fluid in said operating line, and means to automatically compensate for increase in lag of power impulses due to increase in engine speed, the last named means comprising a fluid channel in communication with the operating line which channel is adapted to be overrun by the cam-operated plunger.

In testimony whereof I affix my signature.

HAROLD CAMINEZ.